United States Patent [19]
Watkins et al.

[11] Patent Number: 5,983,022
[45] Date of Patent: Nov. 9, 1999

[54] SYSTEM AND METHOD FOR USING PROFILES TO MANAGE DATA STREAMS FOR DEVICE VERIFICATION

[75] Inventors: Daniel R Watkins, Saratoga; Sobha Varma, Santa Cruz; Shatwah Mar, Hayward, all of Calif.

[73] Assignee: LSI Logic Corporation, Milpitas, Calif.

[21] Appl. No.: 08/838,798

[22] Filed: Apr. 10, 1997

[51] Int. Cl.$^6$ .................................................... G06F 19/00
[52] U.S. Cl. ......................... 395/708; 707/101; 709/231
[58] Field of Search ........................... 395/708; 707/101; 709/231

[56] References Cited

U.S. PATENT DOCUMENTS

| | | | |
|---|---|---|---|
| 4,532,588 | 7/1985 | Foster | 395/200.68 |
| 5,659,539 | 8/1997 | Porter et al. | 395/200.61 |
| 5,737,495 | 4/1998 | Adam et al. | 395/615 |
| 5,768,527 | 6/1998 | Zhu et al. | 395/200.61 |
| 5,771,009 | 6/1998 | Nakaya | 341/50 |
| 5,787,253 | 7/1998 | McCreery et al. | 395/200.61 |
| 5,805,823 | 9/1998 | Seitz | 395/200.66 |

*Primary Examiner*—Krisna Lim
*Attorney, Agent, or Firm*—Conley, Rose & Tayon, PC; B. Noel Kivlin

[57] ABSTRACT

A bitstream management system and method which provides an infrastructure to enable comprehensive testing of devices that implement multiple syntax rule sets. In this system and method, modules for the individual syntax rule sets are implemented using profiles (concise representations of data streams). The modules each have a profile generator which determines a permutation of selected values for a set of syntax variables and translates that permutation into a profile. The modules also each have a data stream generator which converts the profiles into the data streams they represent. The use of profiles provides an advantageous method for maintaining the modularity of the syntax modules when integrating them together to provide a system for generating data streams which must comply with multiple syntax rule sets. Broadly speaking, the present invention contemplates a method of data stream management which comprises: (i) determining a set of profiles, wherein each of the profiles is a list of values which specifies the contents of a data stream; (ii) doing processing on the profile as if it were a data stream, and (iii) converting each of the profiles into a data stream. The determination may comprise (a) receiving a set of candidate values for each of a set of syntax variables; (b) selecting a value for each of the syntax variables from the corresponding sets of candidate values; and (c) translating the selected values into a profile.

24 Claims, 6 Drawing Sheets

FIG. 2

DVD bs Syntax

Verification Environment a) | System Header | V, A, SPU, NAVI PES |  →  System b) | Pack Header | 14B | V_PKT |  →  V pes c) | Pack Header | 14B | V_PKT |  →  A pes d) | Packet Header 9-24B | SS 1B | Audio fi 3B | Audio di 3B | Data 1 - 2013B |  →  Lpcm es e) | Packet Header 9-24B | SS 1B | fi 3B | Data 1 - 2016B |  →  AC3 es f) | Packet Header 9-24B | Data 1 - 2020B |  →  Musicam es g) | Pack Header | 14B | Packet Header 9-24B | SS 1B | Data |  →  SPU pes h) | Pack Header | 14B | System Header 24B | Packet Header 9-24B | SS 1B | PCI Data | Packet Header 9-24B | SS 1B | DSI Data |  →  NAVI pes

SYSTEM AND METHOD FOR USING PROFILES TO MANAGE DATA STREAMS FOR DEVICE VERIFICATION

BACKGROUND OF THE INVENTION

1. Field of the Invention

This invention relates to the field of bitstream testing devices, and in particular to a system for managing bitstreams which can be used for device testing.

2. Description of the Related Art

Electronic systems which perform data stream processing are being developed for many applications including video and audio compression such as MPEG, JPEG, and AC3, high-speed interconnection such as Fiber Channel and 1394, and digital communication such as wireless, Ethernet, V34 modems and ATM. By necessity, the development of systems for these applications includes testing and verification of system designs, and in particular, testing and verification of the system's implementation of the data stream syntax.

The data stream processing systems convert a stream of data to or from a structured sequence of data having a syntax. The syntax causes the portions of the data stream to assume meaning, i.e. the structured sequence cannot be treated as a stream of random data. Rather, the syntax is expected to be present, and structured data sequences must be used to test that data stream processing systems properly implement their functions.

A testing approach used in the past relies on a library of sample sequences which are constructed to test specific syntax rules, specific combinations of syntax rules, or performance on "typical" sequences. This approach has the drawback of requiring an enormous amount of storage space in order to provide a moderate amount of test coverage in today's increasingly sophisticated encoding and decoding algorithms. Furthermore, these libraries are difficult to produce and difficult to modify when syntax rules change. Also, simply combining libraries to test a device which incorporates multiple syntax sets does not provide adequate or efficient test coverage.

SUMMARY OF THE INVENTION

The problems outlined above are in large part solved by a bitstream management system and method which provides an infrastructure to enable comprehensive testing of devices that implement multiple syntax rule sets. In one embodiment, modules for the individual syntax rule sets are implemented using profiles, which are concise representations of data streams. The profile may take the form of a compressed data stream, a filtered data stream, or some combination of these (e.g. a filtered data stream which is then compressed). The syntax modules each have a profile generator which accepts a permutation of selected values for a set of syntax variables and which translates that permutation into a profile. In a first embodiment, the modules also each have a data stream generator which converts the profiles into the data streams they represent. In a second embodiment, the modules have a data stream checker which processes profiles to determine the compliance of the data stream to specified check rules. In a third embodiment, the modules have a coverage measurement element which processes profiles according to a coverage filter to determine the coverage provided for specified syntax and semantic situations, and to assess collective coverage over multiple profiles and the corresponding data streams. The use of profiles provides an advantageous method for maintaining the modularity of the syntax modules when integrating them together to provide a system for managing data streams which must comply with multiple syntax rule sets.

Broadly speaking, the present invention contemplates a method of data stream management which comprises: (i) determining a set of profiles, wherein each of the profiles is a list of values which specifies the contents of a data stream, (ii) doing processing as if it were a data stream, and (iii) converting each of the profiles into a data stream. The determination may comprise (a) receiving a set of candidate values for each of a set of syntax variables; (b) selecting a value for each of the syntax variables from the corresponding sets of candidate values; and (c) translating the selected values into a profile.

The present invention further contemplates a system for data stream management which includes a syntax module. The syntax module has a profile generator configured to receive a set of candidate values for each of a set of syntax variables, and configured to provide a profile specifying a selected value for each of the syntax variables. The syntax module also has a data stream generator configured to receive the profile and convert the profile into a first data stream. The data stream management system may further include other syntax modules similarly configured, with one of the syntax modules additionally configured to receive the data streams of the other syntax modules for use in the generation of a final data stream.

BRIEF DESCRIPTION OF THE DRAWINGS

Other objects and advantages of the invention will become apparent upon reading the following detailed description and upon reference to the accompanying drawings in which:

FIGS. 2a, 2b, 2c, 2d, 2e, 2f, 2g and 2h illustrate the DVD bitstream syntax rule set which includes syntax rule sets for audio, video, sub-picture unit and navigation data streams;

Figure 1:
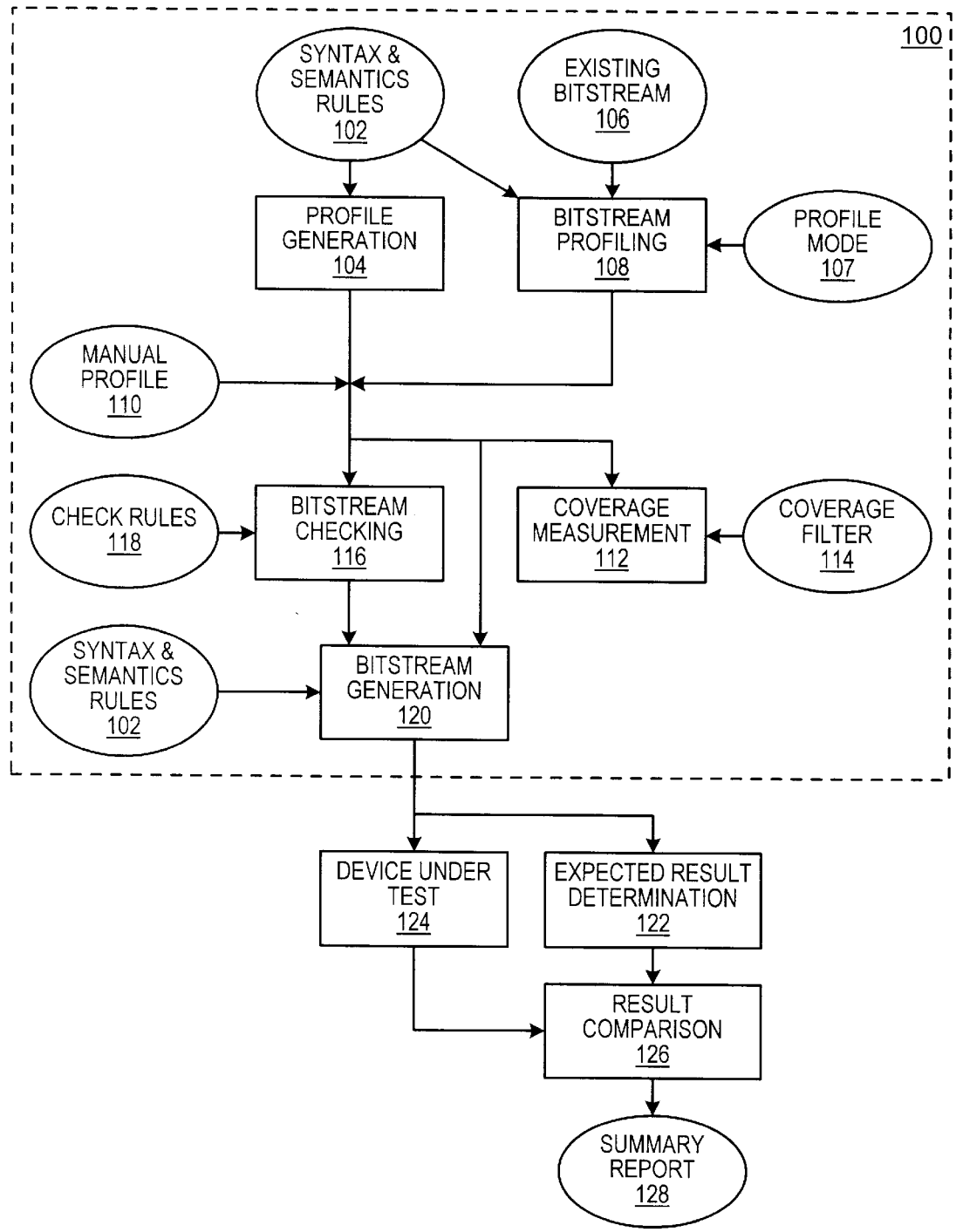
FIG. 1 illustrates a bitstream management method for generating, checking, and determining coverage by a set of data streams for functional verification.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a bitstream management method 100 is shown. The method comprises a profile generation step 104, a coverage measurement step 112, a bitstream checking step 116, and a bitstream generation step 120. The system may also comprise a bitstream profiling step 108. Also shown are a device under test 124, an expected result determination step 122, a result comparison step 126, a summary report output 128, and various inputs which may include syntax & semantics rules 102, existing bitstreams 106, profile mode selections 107, manually generated profiles 110, and check rules 118.

The bitstream management method shown in FIG. 1 processes some of the inputs to yield a set of profiles. The profiles are very compact representations of data streams, so that each data stream has its own profile. A profile may be obtained by filtering the data stream (i.e. retaining only those portions of interest), compacting the data stream, or some combination of filtering and compacting the data stream. A reason for doing this is that data streams, which are typically very large, may be manipulated by manipulating their profiles. The use of profiles provides a unified system structure that advantageously enables the testing of different syntax rule sets within a system, as will be discussed further below.

Profiles may be generated manually and provided as an input, as illustrated by manual profile 110, they may be generated by processing an existing bitstream 106, or they may be generated in the profile generation step 104. In the bitstream profiling step 108, the existing bitstream 106 is parsed according to the syntax & semantics rules 102 to determine the values for each of the syntax variables defined by the existing bitstream 106. These values are then translated into a profile which is provided as output from bitstream profiling step 108. The form which the profile takes is determined by profile mode selection 107. Profile mode selection mode 107 may specify a compression algorithm to be used, a filtering operation to be applied, or some combination of these.

Profile generation step 104 uses a knowledge of the syntax & semantics rules 102 to generate valid (or if desired, certain invalid) permutations of values which may occur in a bitstream governed by that syntax rule set. The permutation of values is then translated into a profile of a bitstream. The profile of a bitstream will be highly dependent on the bitstream, but typically it is unnecessary to quote within the profile the exact values that will be used. Rather, an indication of the meaning of the values is preferably used, and this indication is preferably human-readable. For example, a sequence of audio samples might be represented by a character string such as "3 kHz SINE" or "TICK-TOCK". Alternatively, the profile may be provided in the form of a filtered and/or compressed data stream. In any case, the profile consists of a list of values which is sufficient to specify the exact contents of the bitstream.

The set of profiles made available by profile generation step 104, bitstream profiling step 108 and/or manual profile input 110 may be processed in three different ways. First, the set of profiles may be examined in coverage measurement step 112 using parameters provided in the form of a coverage filter 114 to determine the coverage of a particular aspect of the syntax structure or device design. The coverage determination algorithm is typically dependent on the aspect for which coverage is being determined. An example of a coverage measurement is the percentage of a number of popular syntax constructions represented by one or more profiles in the set.

Second, the set of profiles may be checked in bitstream checking step 116 according to a set of check rules 118. The set of profiles is processed to select profiles which conform to the set of rules 118. The selected profiles may then be forwarded for further use, e.g. in FIG. 1 the selected profiles are provided to bitstream generation step 120.

Third, the set of profiles may be converted into bitstreams by bitstream generation step 120. In bitstream generation step 120 one profile is accepted at a time and converted into the represented bitstream according to the syntax & semantics rules 102, using knowledge of the profile structure. In one application of the bitstream management method, the bitstreams provided by bitstream generation step 120 are applied to the device under test 124 and a means for determining the expected results 122. The outputs of the device under test 124 and the expected result determination step 122 are compared in result comparison step 126, which then generates a summary report 128.

It is noted that the set of profiles made available by profile generation step 104, bitstream profiling step 108 and/or manual profile input 110 will typically be stored for later use and re-use, as opposed to being regenerated each time a set of bitstreams is to be generated, checked, or examined to determine coverage.

As an example of the syntax & semantics rules input, FIGS. 2a, 2b, 2c, 2d, 2e, 2f, 2g and 2h illustrate the sets of syntax rules that need to be supported for a digital video disk (DVD) source decoder design. FIG. 2a is a DVD bitstream having a system header and a mixture of packetized elementary streams (PES). Four types of PES form this mixture: video (V) PES, audio (A) PES, sub-picture unit (SPU) PES, and navigation (NAVI) PES. Each of the four PES types possess a syntax structure. FIG. 2b is a video PES, having a 14 byte pack header and a video packet (V_PKT). The video packet has an MPEG2 syntax structure which will be discussed separately below. FIG. 2c shows an audio PES having a 14 byte pack header and an audio packet (A_PKT). As shown in FIGS. 2d, 2e, and 2f, the audio packet can have one of three syntax structures, depending on the audio encoding standard used (LPCM, AC3, and Musicam, respectively). FIG. 2g shows an SPU PES having a 14 byte pack header, a 9 to 24 byte packet header, a sub-stream (SS) identification byte, and a sequence of data bytes. FIG. 2h shows a navigation PES having a 14 byte header, a 24 byte system header, a 9 to 24 byte packet header, a SS identification byte, a sequence of PCI data bytes, a second 9 to 24 byte packet header, a second SS identification byte, and a sequence of DSI data bytes. Further details of the syntax sets may be found in the DVD specification, version 0.9, April 1996.

Figure 3:
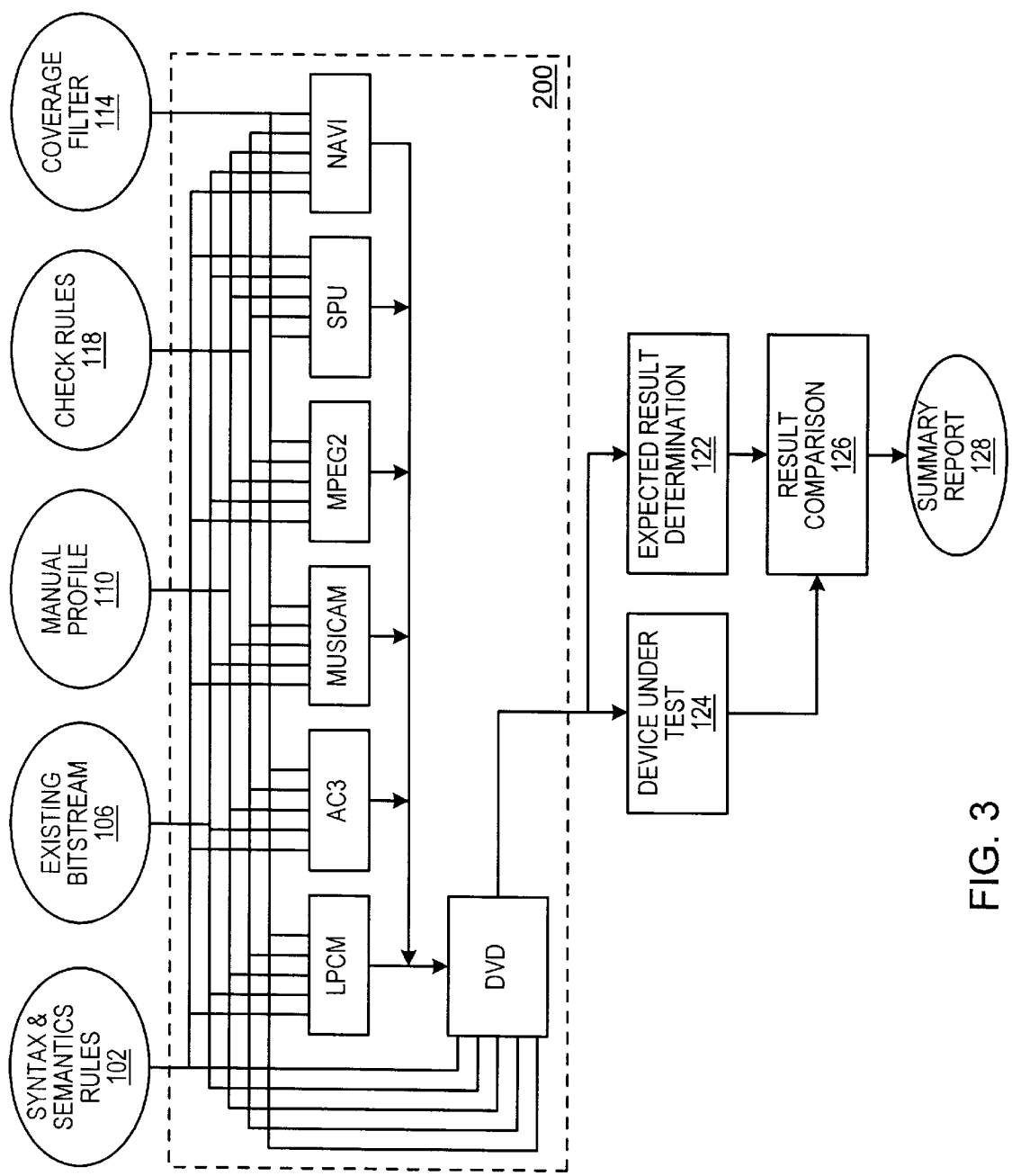
FIG. 3 illustrates a bitstream management method for DVD decoders which have a flat syntax hierarchy.

If each of the three varieties of audio PES (FIGS. 2d, 2e and 2f) is combined with the audio PES pack header (FIG. 2c), then there are six PES syntax types (video, SPU, navigation, and three audio) which stand on equal footing relative to the DVD syntax structure. This "flat hierarchy" of syntax types can be implemented using a bitstream management method 200 as shown in FIG. 3. The method 200 comprises seven method modules, each corresponding to one of the syntax structures. The modules each comprise the steps as shown in FIG. 1, and they each process the inputs as shown in FIG. 1. The DVD method module has a bitstream generation step 120 which additionally accepts the bitstreams provided from the other six method modules. The syntax & semantics rules 102 now comprise six rule sets, with a seventh rule set specifying the syntax for combining the first six. The existing bitstream input 106 can now be a DVD bitstream. The manual profile 110 may represent a DVD bitstream. The check rules 118 may specify situations within any one syntax type or any combination of the syntax types. Similarly, the coverage filter 114 may specify parameters with respect to any one or combination of the syntax types. Each of these inputs is routed to steps within the individual method modules in the manner indicated in FIG. 1.

The individual method modules act in concert to determine the profiles and perform the checking, coverage measurement, or generation processes. For example, in the bitstream generation process, the LPCM module performs bitstream generation step 120 to translate the relevant portions of the DVD bitstream profile into an LPCM bitstream. Similarly, the AC3 module, Musicam module, MPEG2 module, SPU module, and NAVI module each perform bitstream generation step 120 to translate the relevant portions of the profile into the represented bitstreams. The resulting bitstreams are combined in a DVD bitstream generation step performed by the DVD module according to the relevant portions of the profile to produce the overall DVD bitstream. It is noted that the modularity of the profile approach makes a bitstream management method versatile and easily modifiable. Bitstream management steps can also be combined to implement a "vertical hierarchy" of syntax rule sets, for example the MPEG2 standard which is now described.

Figure 4:
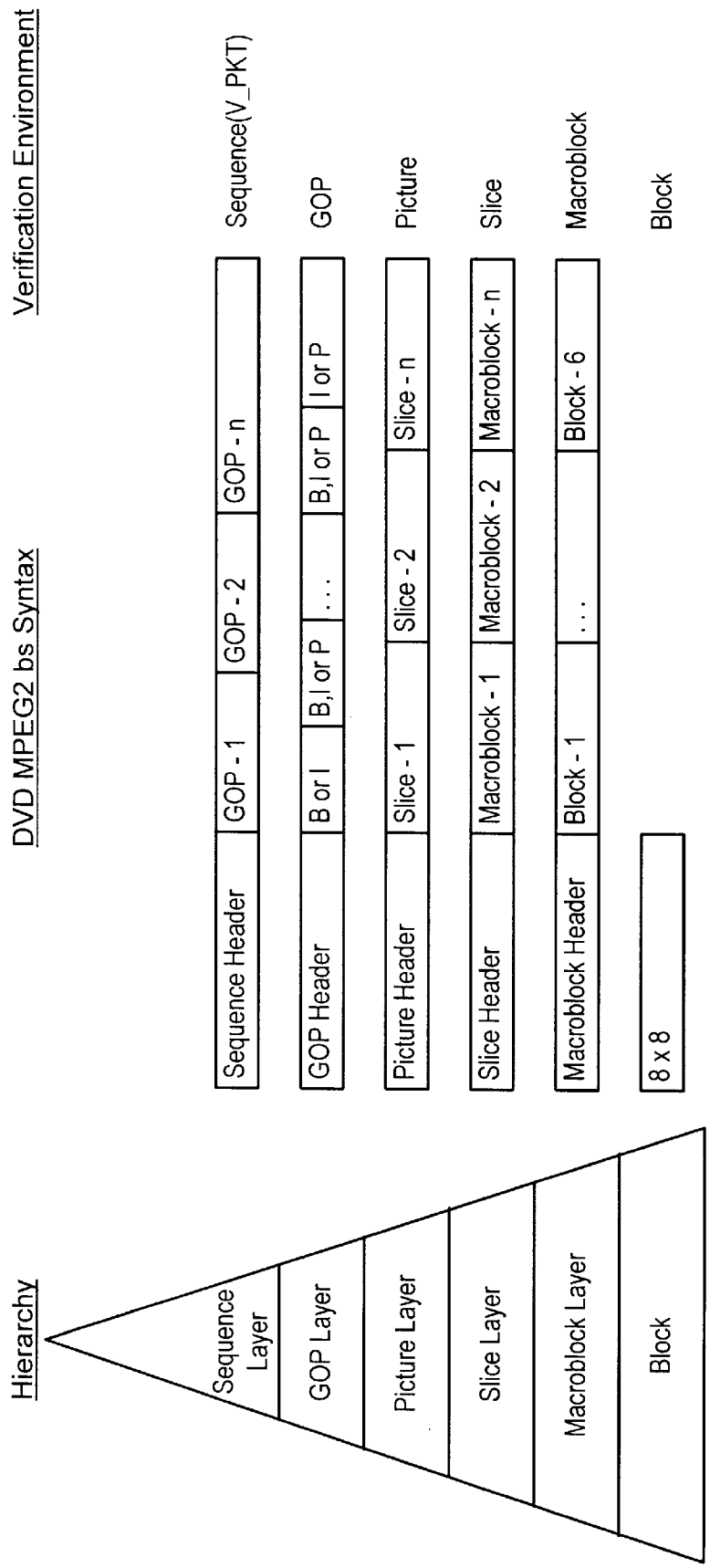
FIG. 4 illustrates the MPEG bitstream syntax rule set which includes syntax rule sets for blocks, macroblocks, slices, pictures, and picture sequences.

The video packet mentioned earlier is encoded according to the MPEG2 standard, which has six syntax structures as shown in FIG. 4. Excepting the first syntax structure, each of the syntax structures is dependent on the preceding syntax structure, hence the pyramid diagram shown in FIG. 4. The block syntax structure is simply a sequence of 64 pixel values describing the colors of an 8×8 square block of pixels in an image. The macroblock syntax structure is a macroblock header followed by six blocks. The slice syntax structure is a slice header followed by a sequence of macroblocks. The picture syntax structure is a picture header followed by a sequence of slices. The group of pictures (GOP) layer is a GOP header followed by a sequence of pictures. The sequence syntax structure is a sequence header followed by a sequence of GOPs. Further details of the MPEG2 syntax sets may be found in the DVD specification, version 0.9, April 1996.

Figure 5:
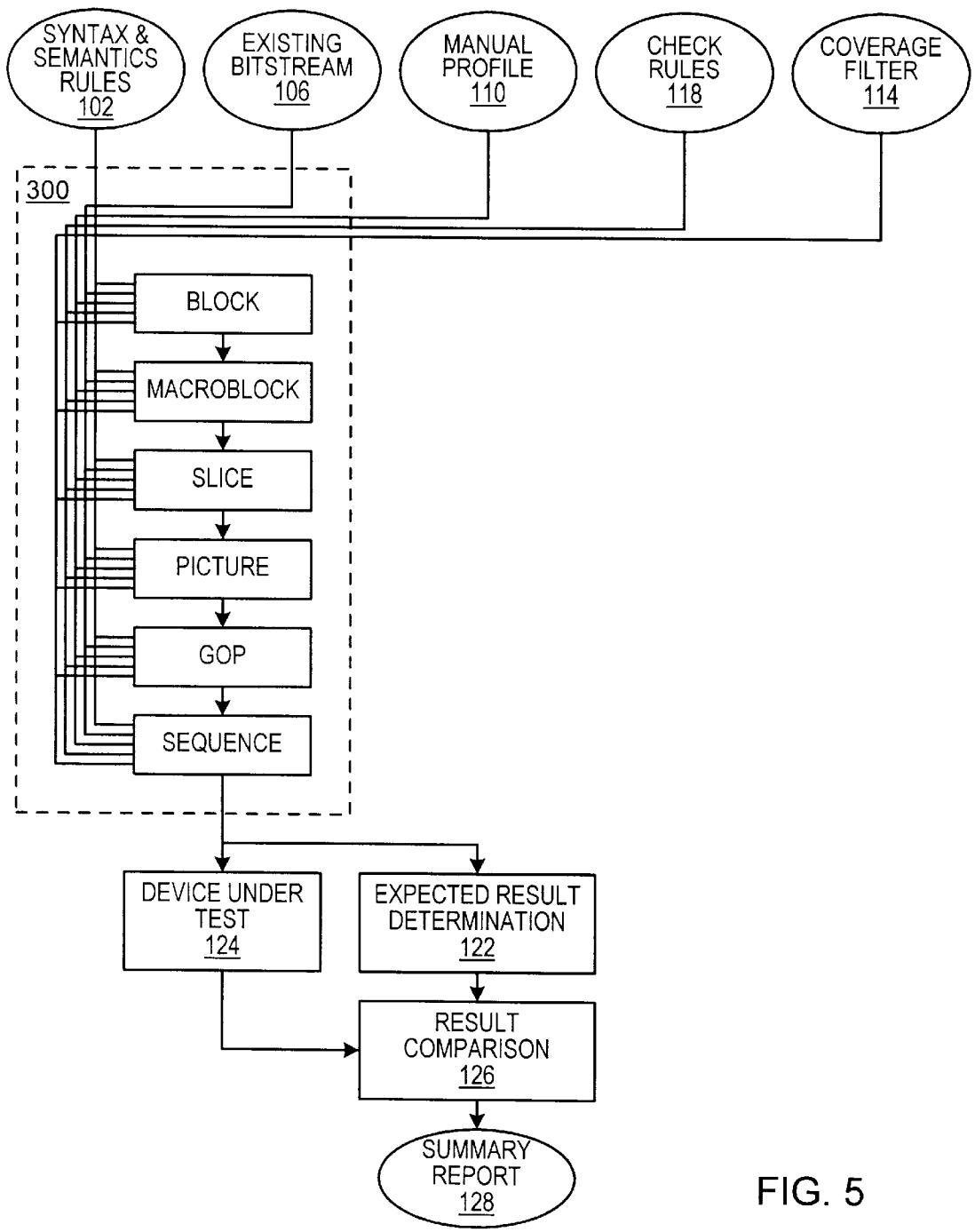
FIG. 5 illustrates a bitstream management method for MPEG decoders which have a vertical syntax hierarchy.

This vertical hierarchy of syntax rule sets can be implemented using the bitstream management method of FIG. 5. The method 300 comprises six method modules, each corresponding to one of the syntax structures. The modules each comprise the steps shown in FIG. 1. The block module executes bitstream generation step 120 to translate the relevant portions of the profile into a block bitstream. The macroblock, slice, picture, GOP, and sequence modules execute bitstream generation steps 120 that additionally accept the bitstreams provided by the preceding module for use in generating a bitstream. The syntax & semantics rules 102 here comprise six rule sets. The existing bitstream input 106 can now be an MPEG2 bitstream. The manual profile 110 may represent an MPEG2 bitstream. The check rules 118 may specify situations within any one syntax type or any combination of the syntax types. Similarly, the coverage filter 114 may specify parameters with respect to any one or combination of the syntax types. Each of these inputs is routed to steps within the individual method modules in the manner indicated in FIG. 1.

The individual modules act in concert to determine the profiles and perform the checking, coverage measurement, or generation processes. For example, in the bitstream generation process, the block module performs the bitstream generation step 120 to translate the relevant portions of the MPEG2 profile into a block bitstream. The macroblock module in performing bitstream generation step 120 accepts the block bitstream and relevant portions of the profile, and generates a macroblock bitstream. Similarly, the slice module, the picture module, the GOP module, and the sequence module each use the bitstream from the previous modules and the relevant portions of the profile to generate the represented bitstreams. The resulting bitstream is an MPEG2 bitstream which may be used to test the functionality of an MPEG video decoder. It is noted that the profile approach advantageously allows the manipulation and testing of a specific syntax rule set to the exclusion of the others, thereby providing the capability to focus on specific problem areas or newly modified device features. It is expected that this will greatly enhance test coverage and reduce testing times for devices with complex syntax rule sets.

The bitstream testing methods presented herein feature a new bitstream management methodology which is preferably implemented in an object oriented programming environment. The modularity of the syntax rule sets is best preserved using modules having objects which can (1) determine permutations of values suitable for each syntax structure, (2) produce profiles representing bitstreams which comply with the syntax structure, (3) generate bitstreams from profiles, (4) determine coverage statistics for rule sets from a set of profiles, (5) examine sets of profiles to find subsets which meet requested criteria, and (6) parse bitstreams to determine profiles. Modules which contain these objects can be easily integrated with modules for other syntax rule sets.

Figure 6:
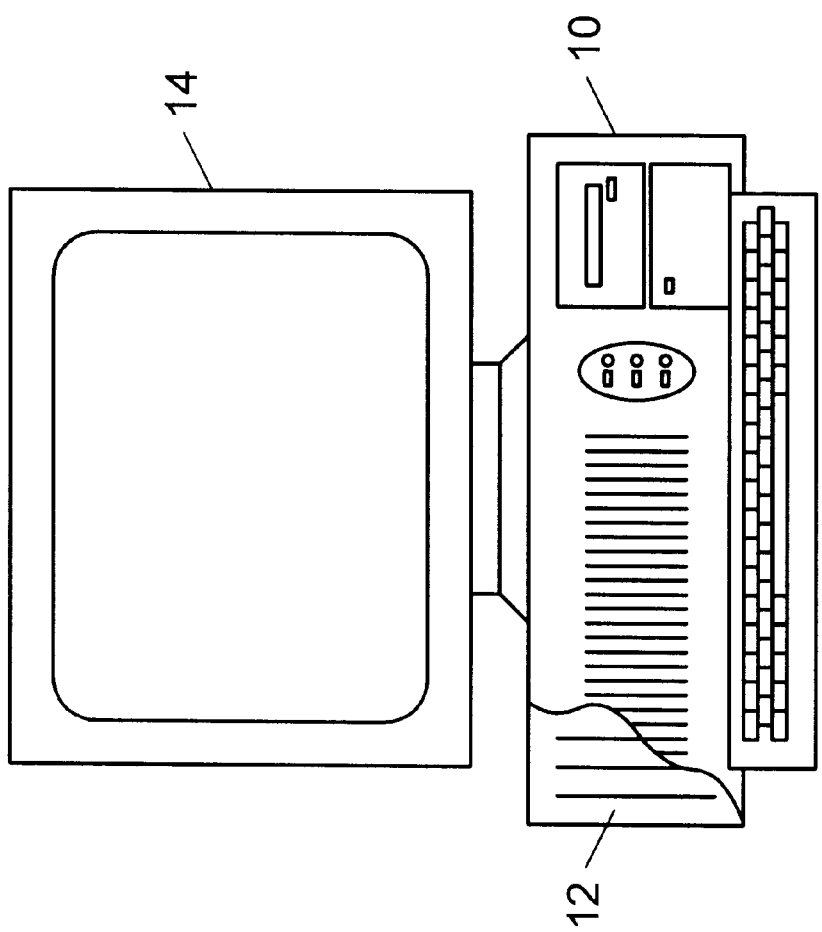
FIG. 6 illustrates a general purpose computer configured to execute software designed according to the bitstream management methodology.

It is noted that the software modules may be stored and run on computer systems of many configurations. FIG. 6 shows a general purpose computer 10 containing a motherboard 12 having a CPU and memory configured to execute the program modules of FIG. 5, or more generally, FIG. 3. The software interfaces with a user (not shown) via a monitor 14 for output and a keyboard for input.

It is noted that the bitstream management methodology advantageously provides the following capabilities: (1) all possible permutations of syntax variable values can be generated, (2) the permutations can be generated in an easy, systematic fashion, (3) test coverage can be determined in a quantifiable manner, (4) permutations can be generated using user specified static variables, (5) the set of profiles can be constrained by selecting specific syntax rules for checking, (6) the set of profiles can be constrained by selecting specific syntax values for checking, (7) the user can interactively (hence guide the testing process based on test results) determine or constrain the profiles used for testing, (8) existing bitstreams can be integrated into the system for use, (9) existing modules can be combined to create systems for testing both flat and vertical hierarchies of syntax rule sets, (10) the systems can be easily automated for regressions or repetitive testing.

Other advantages of the bitstream management methodology may include a significant reduction in required computer effort which results from the use of bitstream profile for full checking and collective coverage analysis rather than the bitstream. Also, the methodology may easily be implemented.

Numerous variations and modifications will become apparent to those skilled in the art once the above disclosure is fully appreciated. For example, this method may be applied to generalized data streams rather than simply bitstreams as described. It is intended that the following claims be interpreted to embrace all such variations and modifications.

What is claimed is:

1. A method of data stream management for data stream generation, comprising the steps of:
   determining a set of profiles, wherein each of said profiles is a list of values which specifies the contents of a data stream, and wherein said determining step includes the steps of:
      selecting a selected value for each of a set of syntax variables from corresponding sets of candidate values, and
      translating the selected values into a profile; and
   converting each of said set of profiles into a data stream, wherein said converting step includes the steps of:
      translating a profile into selected values for each of a set of syntax variables, and
      generating a data stream that complies with a predetermined syntax, wherein portions of the data stream that correspond to said set of syntax variables are set to corresponding selected values.

2. The method of claim 1, further comprising the steps of: processing one of said data streams to determine expected test output; and comparing an actual test output to the expected test output to determine a test result.

3. The method of claim 1, wherein said determining step further comprises the step of repeating said selecting and translating steps to produce profiles for each possible permutation of said candidate values.

4. The method of claim 1, wherein said determining step further comprises the steps of:
   receiving a set of user-requested tests; and
   identifying profiles which match the user-requested tests.

5. A method of data stream management for data stream generation, comprising the steps of:
   determining a set of profiles, wherein each of said profiles is a list of values which specifies the contents of a data stream, and wherein said determining step includes the step of:
      parsing an existing data stream to establish a profile which represents the existing data stream; and
   converting each of said set of profiles into a data stream, wherein said converting step includes the steps of:
      translating a profile into selected values for each of a set of syntax variables, and
      generating a data stream that complies with a predetermined syntax, wherein portions of the data stream that correspond to said set of syntax variables are set to corresponding selected values.

6. The method of claim 5, further comprising the step of examining said set of profiles to determine their collective coverage of a set of user-requested tests.

7. The method of claim 5, wherein the list of values includes a filtered version of an original data stream.

8. The method of claim 5, wherein the list of values includes the data stream in a compressed form.

9. A method of data stream management for data stream checking, comprising the steps of:
   determining a set of profiles, wherein each of said profiles is a list of values which specifies the contents of a data stream, and wherein said determining step includes the steps of:
      selecting a selected value for each of a set of syntax variables from corresponding sets of candidate values, and
      translating the selected values into a profile; and
   examining each of said set of profiles to ascertain which profiles comply with a specified rule set.

10. A method of data stream management for data stream checking, comprising the steps of:
    determining a set of profiles, wherein each of said profiles is a list of values which specifies the contents of a data stream, and wherein said determining step includes the step of:
       parsing an existing data stream to establish a profile which represents the existing data stream; and
    examining each of said set of profiles to ascertain which profiles comply with a specified rule set.

11. The method of claim 10, wherein the list of values includes the data stream in a compressed form.

12. The method of claim 10, wherein the list of values includes a filtered version of an original data stream.

13. A computer for managing data streams, wherein said computer comprises:
    a memory configured to store bitstream management software, wherein said bitstream management software includes a first syntax module having:
       a first profile generator object configured to generate a first profile by selecting a value for each of a set of syntax variables from corresponding sets of candidate values; and
       a first data stream generator object configured to receive said first profile and responsively generate a first data stream that complies with a predetermined syntax, wherein portions of the first data stream that correspond to said set of syntax variables are set to values specified by the first profile;
    a user input device configured to receive user input; and
    a CPU coupled to respond to said user input, coupled to access said memory, and configured to execute said bitstream management software.

14. A system for data stream management, comprising:
    a first syntax module which includes:
       a profile generator configured to receive a set of candidate values for each of a set of syntax variables, and configured to provide a profile specifying a selected value for each of the syntax variables;
       a data stream generator configured to receive said profile and responsively provide a first data stream that complies with a predetermined syntax, wherein portions of the first data stream that correspond to said set of syntax variables are set to corresponding selected values;
       a profile selector configured to receive a set of user-requested tests, and configured to identify profiles from the profile generator which match the user-requested tests; and
       a collective coverage measurement unit configured to receive a set of user-requested tests and a set of profiles, and further configured to determine the coverage of the set of tests by the set of profiles; and
    a second syntax module which includes:
       a second profile generator configured to receive a second set of candidate values for each of a second set of syntax variables, and configured to provide a second profile specifying a selected value for each of the syntax variables in the second set of syntax variables; and
       a second data stream generator configured to receive said second profile and a set of data streams including said first data stream, wherein the second data stream generator is configured to responsively provide a second data stream that complies with a second predetermined syntax, wherein portions of the second data stream that correspond to said second set of syntax variables are set to corresponding selected values; and an expected result determination unit configured to process said second data stream to responsively provide an expected test output.

15. A method of data stream management for coverage measurement, comprising the steps of:
   determining a set of profiles, wherein each of said profiles is a list of values which specifies the contents of a data stream, and wherein said determining step includes the steps of:
      selecting a selected value for each of a set of syntax variables from corresponding sets of candidate values, and
      translating the selected values into a profile; and
   applying an algorithm to said set of profiles to ascertain a coverage measurement.

16. A method of data stream management for coverage measurement, comprising the steps of:
   determining a set of profiles, wherein each of said profiles is a list of values which specifies the contents of a data stream, and wherein said determining step includes the step of:
      parsing an existing data stream to establish a profile which represents the existing data stream; and
   applying an algorithm to said set of profiles to ascertain a coverage measurement.

17. The method of claim 16, wherein the list of values includes a filtered version of an original data stream.

18. The method of claim 16, wherein the list of values includes the data stream in a compressed form.

19. A system for data stream management, comprising:
   a first syntax module which includes:
      a profile generator configured to receive a set of candidate values for each of a set of syntax variables, and configured to provide a profile specifying a selected value for each of the syntax variables; and
      a data stream generator configured to receive said profile and responsively provide a first data stream that complies with a predetermined syntax, wherein portions of the data stream that correspond to said set of syntax variables are set to corresponding selected values.

20. The system of claim 19, wherein said syntax module further includes:
   an expected result determination unit configured to receive said data stream and responsively provide an expected test output.

21. The system of claim 19, wherein said syntax module further includes:
   a profile selector configured to receive a set of user-requested tests, and configured to identify profiles from the profile generator which match the user-requested tests.

22. The system of claim 19, wherein said syntax module further includes:
   a collective coverage measurement unit configured to receive a set of user-requested tests and a set of profiles, and further configured to determine the coverage of the set of tests by the set of profiles.

23. The system of claim 19, further comprising:
   a second syntax module which includes:
      a second profile generator configured to receive a second set of candidate values for each of a second set of syntax variables, and configured to provide a second profile specifying a selected value for each of the syntax variables in the second set of syntax variables; and
      a second data stream generator configured to receive said second profile and a set of data streams including said first data stream, wherein the second data stream generator is configured to convert said second profile and said set of data streams into a second data stream.

24. The system of claim 23, further comprising:
   a third syntax module configured to produce a third data stream, wherein said set of data streams includes said third data stream.

* * * * *